United States Patent [19]

Copenhaver

[11] 4,130,820
[45] Dec. 19, 1978

[54] MULCHER ATTACHMENT FOR CULTIVATOR

[76] Inventor: Henry A. Copenhaver, Rte. 2, Box 65, Walsh, Colo. 81090

[21] Appl. No.: 822,994

[22] Filed: Aug. 8, 1977

[51] Int. Cl.² .................................................. A01B 35/24
[52] U.S. Cl. ..................................... 172/707; 172/771
[58] Field of Search ............... 172/705, 707, 771, 768, 172/624, 748, 657, 710, 514, 515, 551

[56] References Cited

U.S. PATENT DOCUMENTS

| 222,500 | 12/1879 | Hughes | 172/771 X |
|---|---|---|---|
| 2,857,834 | 10/1958 | Hirasuna | 172/771 |
| 2,963,095 | 12/1960 | Oehler | 172/705 |
| 3,331,451 | 7/1967 | Zoeteman | 172/657 |
| 3,536,145 | 10/1970 | Clark | 172/710 |
| 3,800,881 | 4/1974 | Washburn | 172/710 |

FOREIGN PATENT DOCUMENTS

| 379775 | 9/1907 | France | 172/705 |
|---|---|---|---|

*Primary Examiner*—Richard J. Johnson

*Attorney, Agent, or Firm*—Clarence A. O'Brien; Harvey B. Jacobson

[57] ABSTRACT

A bracket structure is provided for attachment to the rock shaft of a draft implement and a swing arm having front and rear ends is pivotally attached at its front end to the bracket structure for oscillation of the swing arm relative to the bracket structure in a vertical plane about a horizontal transverse axis between a position with the swing arm generally horizontally disposed and a rearwardly and downwardly inclined position. Positioning and limit structure is operatively connected between the bracket structure and the swing arm limiting downward swinging of the arm relative to the bracket structure, allowing upward swinging of the rear end of the swing arm toward a horizontal position and including force structure yielding biasing the swing arm toward its limit of rearward downward inclination. The rear end of the swing arm includes a reversible smoothly laterally curving strap-type terminal end constructed of spring material.

3 Claims, 4 Drawing Figures

MULCHER ATTACHMENT FOR CULTIVATOR

BACKGROUND OF THE INVENTION

1. Field of the Invention

In many areas where farming is undertaken, a need exists for an implement tool to control weeds and to also conserve moisture. When row crops are farmed with a lister, many forms of different implements are used in conjunction therewith to control weeds and moisture. These various implements include disks, shovels and drags. However, these various forms of implements tend to choke with cut weeds and other debris resulting in reduced performance in weed control and moisture retention. Accordingly, a need exists for an implement for use in farming row crops with a lister and which will operate more efficiently to control weeds and conserve moisture.

2. Description of the Prior Art

Various forms of implements, including some of the general structural and operational features of the instant invention are disclosed in U.S. Pat. Nos. 189,087, 941,298, 1,138,307, 1,145,136, 1,733,046, 2,216,085, and 2,487,609.

BRIEF DESCRIPTION OF THE INVENTION

The attachment of the instant invention is designed for mulching purposes and includes a vertically swingable rearwardly and downwardly inclined arm yieldingly biased toward a lower limit position and including a smoothly laterally curving strap-type terminal end constructed of spring material.

The main object of this invention is to provide a mulcher attachment which will operate efficiently to control weeds and to conserve moisture.

Another object of this invention is to provide an attachment which will be capable of efficient operation under varying soil conditions.

Still another object of this invention is to provide an attachment in accordance with the preceding objects and which will be readily useable in conjunction with various row crops.

Yet another important object of this invention is to provide a mulcher attachment which may be readily mounted on various types of farming implements, including listers.

A final object of this invention to be specifically enumerated herein is to provide a mulcher attachment in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
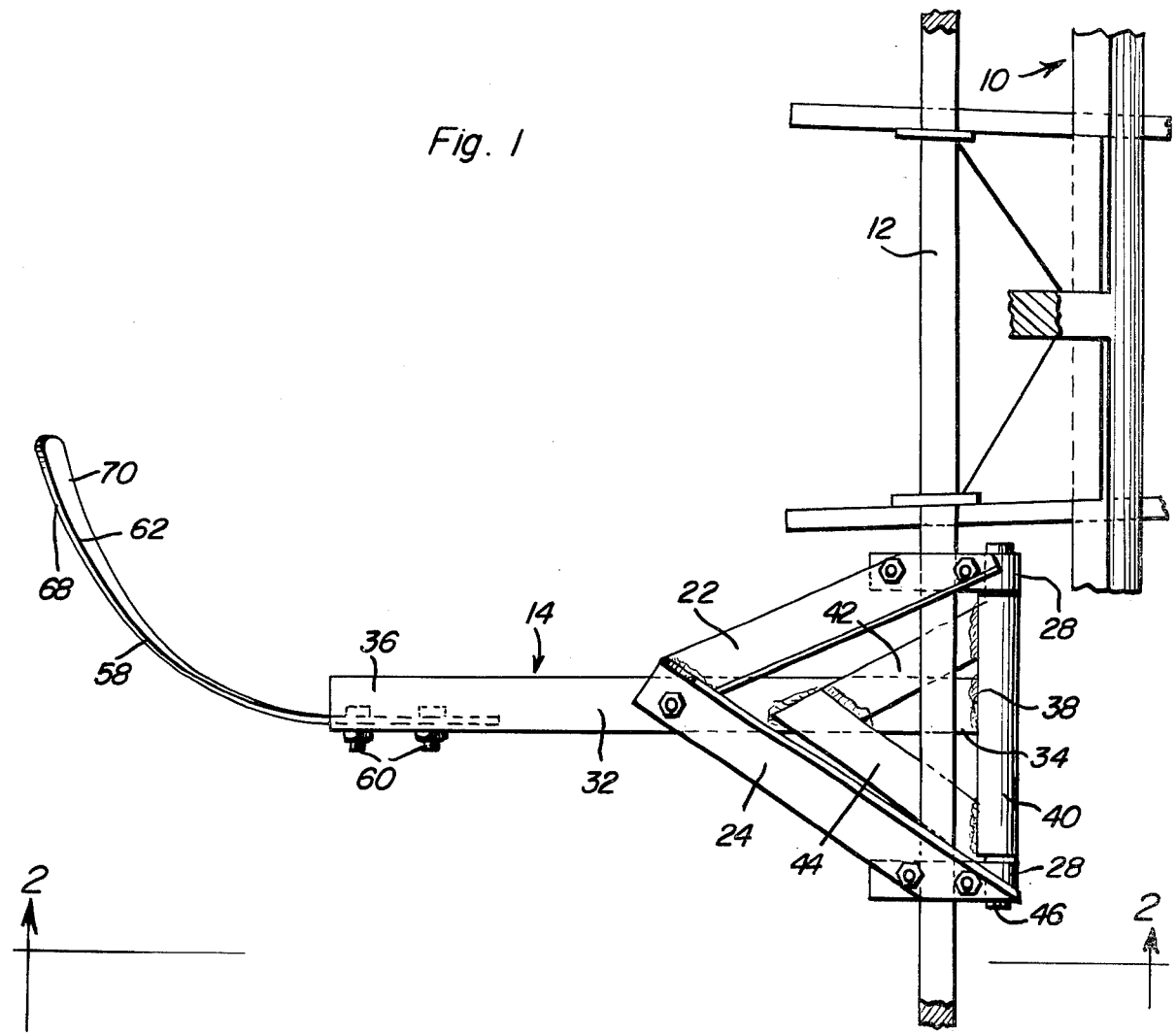
FIG. 1 is a fragmentary, top, plan view of a draft implement, including a rock shaft with the mulcher attachment of the instant invention operatively mounted on the rock shaft of the implement.
Figure 2:
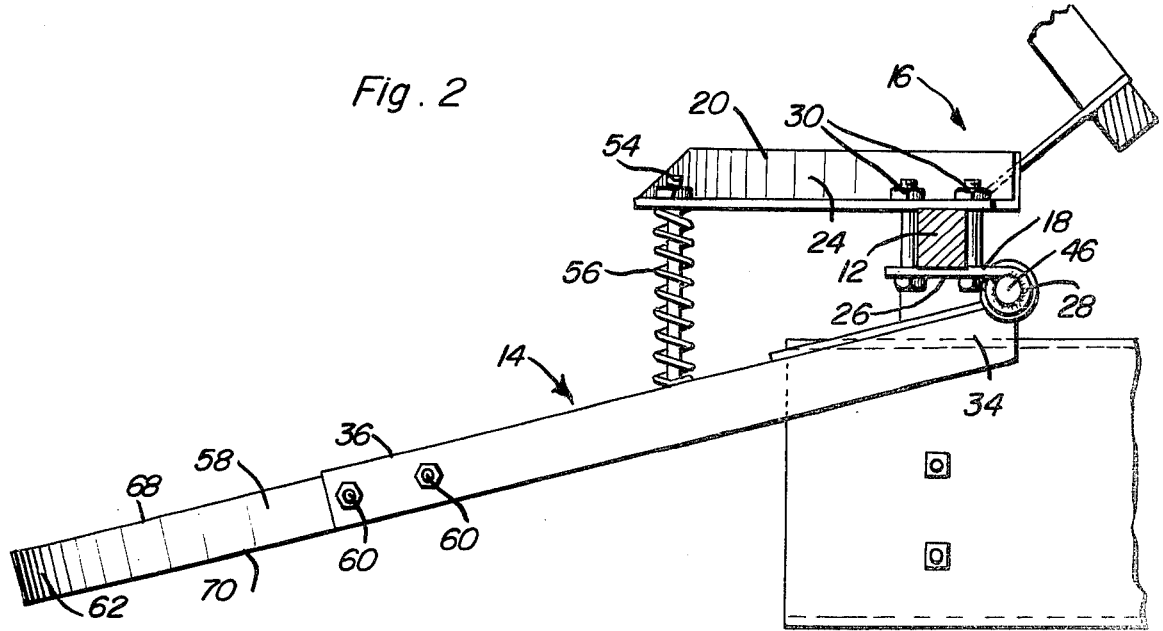
FIG. 2 is a longitudinal, vertical sectional view taken substantially upon a plane indicated by the section line 2—2 of FIG. 1.
Figure 3:
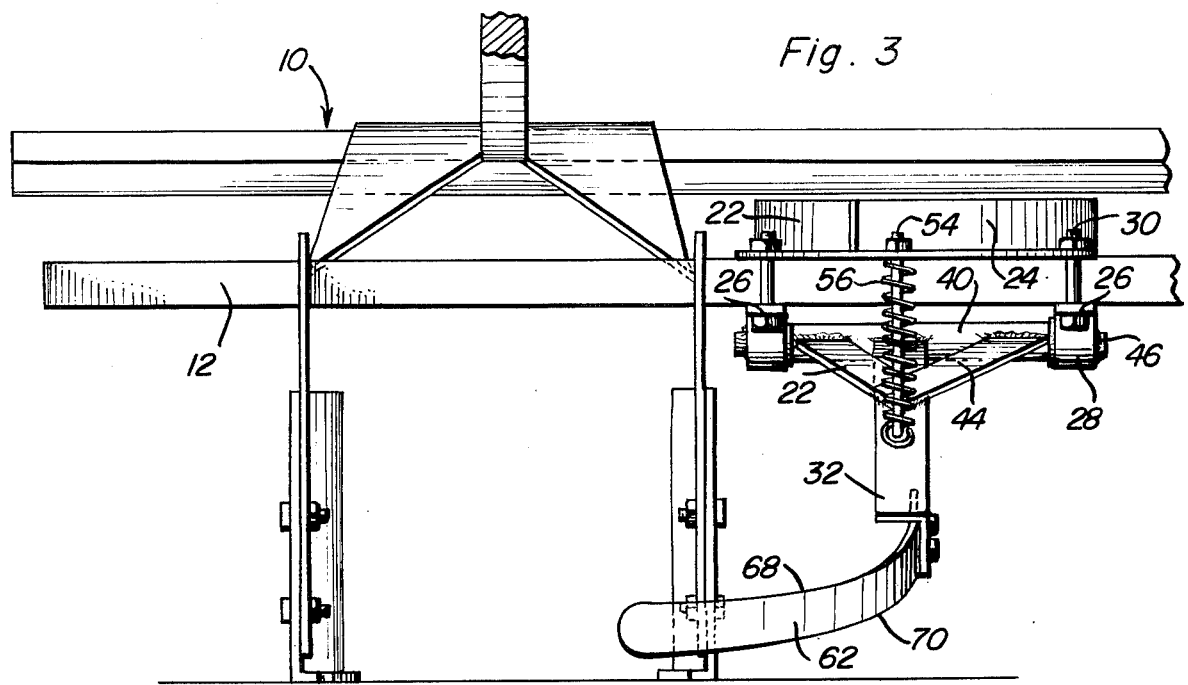
FIG. 3 is a fragmentary, rear, elevational view of the assemblage illustrated in FIG. 1.
Figure 4:
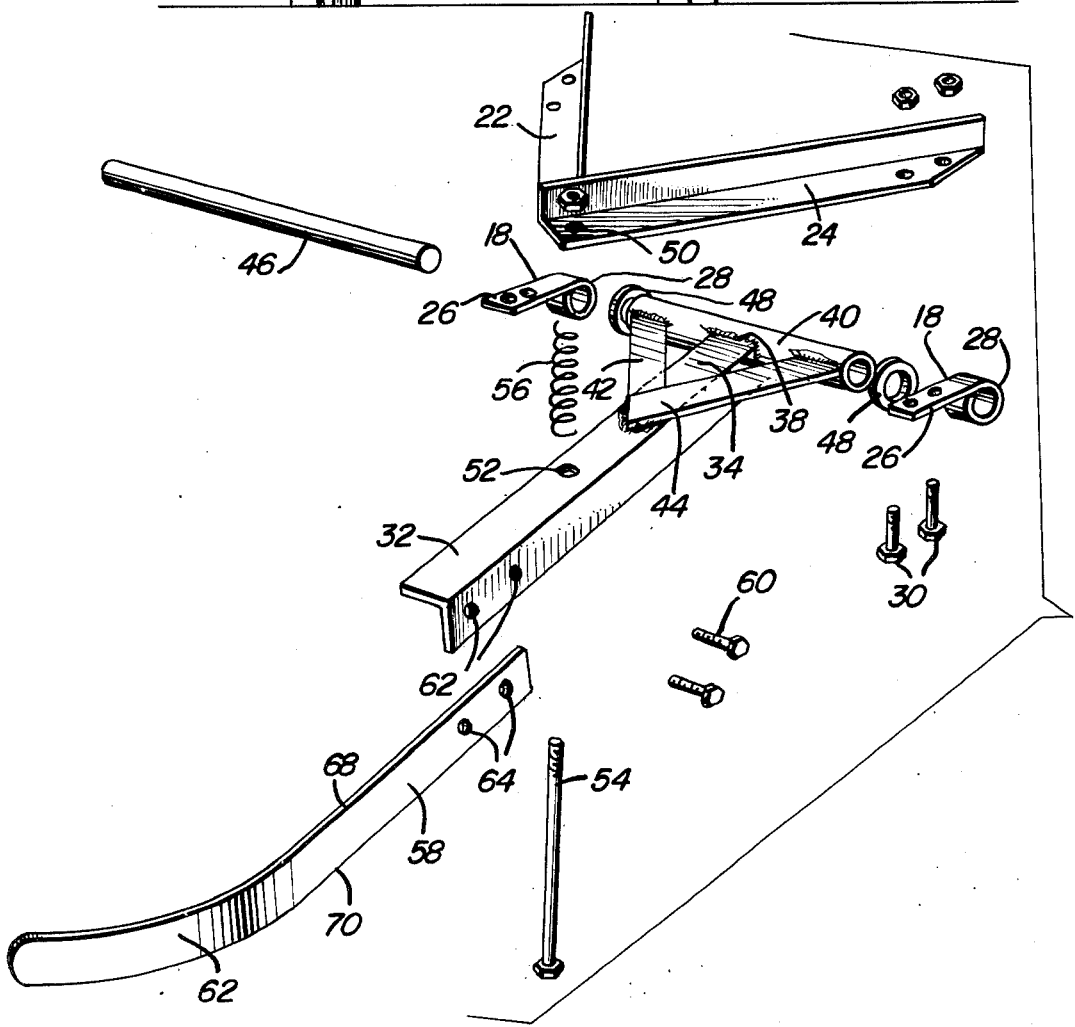
FIG. 4 is an exploded, perspective view of the mulcher attachment.

Referring now more specifically to the drawings, the numeral 10 generally designates a conventional form of draft implement including a rock shaft 12. The mulcher attachment of the instant invention is referred to in general by the reference numeral 14 and includes a mounting bracket assembly referred to in general by the reference numeral 16. The mounting bracket assembly 16 includes a pair of lower laterally spaced journal bracket 18 and an upper forwardly opening generally V-shaped bracket 20 including a pair of forwardly divergent angle members 22 and 24 integrally joined together at their rear ends in any convenient manner, such as by welding.

The journal brackets 18 include planar mounting portions 26 and generally cylindrical journal portions 28. The mounting portions 26 underlie longitudinally spaced portions of the rock shaft 12 and the forward ends of the angle members 22 and 24 overlie those portions of the rock shaft 12 beneath which the mounting portions 26 are disposed with pairs of fasteners 30 secured between each angle member and the associated mounting portion 26.

A swing arm 32 is included and includes front and rear ends 34 and 36. The front end of the swing arm 32 is secured, as by welding 38, to the longitudinal median portion of a mounting sleeve 40. The forward end 34 of the swing arm 32 is braced relative to the opposite ends of the mounting sleeve 40 by means of rearwardly convergent bracing members 42 and 44 secured at their divergent forward ends to opposite end portions of the mounting sleeve 40 and secured together at their rearward convergent ends and to a longitudinal medial portion of the support arm 32.

A pivot shaft 46 is provided and is secured through the journal members 28 and the mounting sleeve 40 is journaled on the pivot shaft 46 between the mounting portions 26 of the journal brackets 18 with spacing washers 48 disposed on the shaft 46 between the opposite ends of the mounting sleeve 40 and the journal members 28.

The rear end of the angle member 24 has a vertical bore 50 formed therethrough in vertical registry with the longitudinal midportion of the support arm 32 and the latter includes a bore 52 with which the bore 50 is registered. An elongated rod 54 has its opposite ends secured through the bores 50 and 52, the rod 54 being slidable through each of the bores 50 and 52. Further, a compression spring 56 is disposed about the rod 54 between the angle member 24 and the swing arm 32.

The rear end of the swing arm 32 includes a removable and reversible arcuate terminal end portion 58 which is removably secured to the support arm 32 by means of suitable fasteners 60 secured through registered bores 62 and 64 formed through the support arm 32 and terminal end 58. The terminal end 58 includes a smoothly laterally curving rear end portion 62 and the terminal end 58 is defined by a strap member constructed by spring material disposed with its opposite longitudinal edges 68 and 70 facing upwardly and downwardly, respectively.

In operation, the laterally curving end portion 62 may be supported from the support arm 32 in order that the end portion 62 may curve laterally outwardly of the desired side of the support arm 32. A pair of the attachments 14 may be utilized on opposite sides of a row to be cultivated by any suitable form of ground working elements (not shown) supported from the implement 10. As the attachments 14 trail the leading earthworking tools of the implement 10, the cultivated soil on opposite sides of each row may be directed inwardly toward the row crop. In this manner, the row crop is mulched and moisture of the soil immediatey adjacent the row crop is conserved. The spring mounting of the support arm 32 enables the latter to raise upwardly when an obstruction is encountered and to also raise upwardly in order to clear weed stubbles tending to build up along the underside of the rear end of the support arm 32. The support arm 32 is of a length in relation to the height of the rock shaft 12 whereby the arm 32 is inclined rearwardly and downwardly relative to the horizontal between 15° and 30°. In this manner, any weed stubble and obstacles encountered by the laterally curving rear end portion 62 is effective to raise the rear end of the support arm 32 against the biasing action of the compression spring 56 in order that the laterally curving rear end portion 62 may be substantially immediately cleared off the obstruction.

Further, the resiliency of the terminal end 58 enables it to yield under contact with larger clumps of dirt and weeds and thereby reduces the tendency of the terminal end portion 58 to direct such larger clumps toward the row crop into contact therewith. However, loose soil is capable of being displaced against and around the base of such row crops.

The foregoing is considered as illustrative only of the priciples of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A mulcher attachment for mounting on the rock shaft of a draft implement, said attachment including bracket means for attachment to said rock shaft, a swing arm having front and rear ends, pivot means pivotally supporting said front end from said bracket means for angular displacement of said arm relative to said bracket about a horizontal axis extending transversely of said arm, the rear end of said arm being inclined downwardly and rearwardly from said bracket means, positioning and limit means operatively connected between said bracket means and arm limiting the downward inclination of said arm relative to said bracket means, allowing upward swinging of the rear end of said arm toward a horizontal position and including force means yieldingly biasing said arm toward its limit of downward inclination, the rear end of said arm including a smoothly laterally curving terminal end constructed of spring material, the front end of the arm including forwardly divergent brace members spaced on opposite sides of the forward terminal end portion of said arm, a sleeve extending and secured between the forward ends of said braces and said forward terminal end portion of said arm, said bracket means comprising a pair of brackets for mounting on said rock shaft at points spaced therealong, a pivot shaft journaled through said sleeve and having its opposite ends supported from said pair of brackets, one of said brackets including a rearwardly projecting arm portion terminating rearwardly over said arm intermediate its front and rear ends, said force means comprising an elongated coiled compression spring, said positioning and limit means including an elongated upstanding rod slidably secured through said arm portion and swing arm at the upper and lower ends thereof, respectively, said compression spring being telescoped over said rod between opposing portions of said bracket means and arm between which said rod extends.

2. The combination of claim 1 wherein said terminal end comprises an elongated spring strap member disposed with its opposite side longitudinal edges facing upwardly and downwardly.

3. The combination of claim 2 wherein said terminal end strap member is removably supported from and comprises a rearward extension of the rear end of said arm.

* * * * *